United States Patent [19]

Agatsuma et al.

[11] Patent Number: 5,932,932
[45] Date of Patent: Aug. 3, 1999

[54] STORAGE BATTERY VOLTAGE CONTROL APPARATUS

[75] Inventors: Eiji Agatsuma; Osamu Saito; Hideharu Takemoto; Kenji Matsumoto, all of Saitama, Japan

[73] Assignee: Honda Giken Kogyo Kabushiki Kaisha, Tokyo, Japan

[21] Appl. No.: 08/926,698

[22] Filed: Sep. 10, 1997

[30] Foreign Application Priority Data

Sep. 10, 1996 [JP] Japan .................................. 8-239257

[51] Int. Cl.$^6$ ................................................. B60R 22/00
[52] U.S. Cl. ......................... 307/10.6; 320/116; 320/134
[58] Field of Search .......................... 320/116–123, 134, 320/159, 160, 164; 307/9.1, 10.1, 10.6, 10.7, 10.8, 43, 64, 53, 65, 66, 77, 85–87, 110, 125, 126, 130, 139, 140, 141; 180/65.1, 65.3, 65.8

[56] References Cited

U.S. PATENT DOCUMENTS

| | | | |
|---|---|---|---|
| 4,079,303 | 3/1978 | Cox | 320/17 |
| 4,238,721 | 12/1980 | DeLuca et al. | 320/18 |
| 4,303,877 | 12/1981 | Meinhold | 320/18 |
| 4,467,266 | 8/1984 | Ritchie | 320/40 |
| 4,502,000 | 2/1985 | Mashikian | 307/53 |
| 4,616,170 | 10/1986 | Urstoger | 320/18 |
| 4,694,237 | 9/1987 | Hanson | 307/66 |
| 4,949,028 | 8/1990 | Brune | 320/6 |
| 4,967,136 | 10/1990 | Nofzinger | 320/6 |
| 5,153,496 | 10/1992 | LaForge | 320/13 |
| 5,283,512 | 2/1994 | Stadnick et al. | 320/18 |
| 5,359,308 | 10/1994 | Sun et al. | 180/65.3 |
| 5,387,857 | 2/1995 | Honda et al. | 320/18 |
| 5,469,042 | 11/1995 | Ruhling | 320/17 |
| 5,498,950 | 3/1996 | Ouwerkerk | 320/18 |
| 5,504,415 | 4/1996 | Podrazhansky et al. | 320/18 |
| 5,545,933 | 8/1996 | Okamura et al. | 307/109 |
| 5,568,038 | 10/1996 | Tatsumi | 307/48 |
| 5,581,170 | 12/1996 | Mammano et al. | 320/17 |
| 5,625,272 | 4/1997 | Takahashi | 320/19 |
| 5,631,534 | 5/1997 | Lewis | 320/15 |
| 5,675,233 | 10/1997 | Kaneko et al. | 320/15 |
| 5,710,504 | 1/1998 | Pascual et al. | 320/6 |
| 5,739,669 | 4/1998 | Brulhardt et al. | 320/6 |
| 5,742,150 | 4/1998 | Khuwatsamrit | 320/116 |

FOREIGN PATENT DOCUMENTS

7 163014 of 1995 Japan .

*Primary Examiner*—Richard T. Elms
*Attorney, Agent, or Firm*—Lyon & Lyon

[57] ABSTRACT

Eight storage battery cells $11_1$ to $11_8$ making up a storage battery cell group 2 can be connected selectively to a voltage-correcting storage battery 12 through nine cell change-over switches $13_1$ to $13_9$, four polarity-inverting switches $14_1$ to $14_4$ and a current-limiting resistor 15. When the voltages of two or more of the storage battery cells $11_1$ to $11_8$ are different, the voltages of each of the storage battery cells $11_1$ to $11_8$ can be equalized by then transferring the charge from a storage battery cell high in voltage to the voltage-correcting storage battery 12 and by transferring the charge of that voltage-correcting storage battery 12 to a storage battery cell low in voltage. As a result, the voltage difference due to the performance variations among the individual storage battery cells $11_1$ to $11_8$ can be obviated thereby to increase the working voltage range of the storage battery cell group 2 as a whole.

20 Claims, 8 Drawing Sheets

STORAGE BATTERY VOLTAGE CONTROL APPARATUS

BACKGROUND OF THE INVENTION

1. Field of the Invention

The present invention relates to a storage battery voltage control apparatus for equalizing the voltage of each of a plurality of series-connected cells of a storage battery.

2. Description of the Related Art

A hybrid vehicle equipped with an internal combustion engine and an electric motor as driving power sources is known which comprises a storage battery including a plurality of series-connected storage battery cells as a power supply for driving the motor as disclosed in JP-A-7-163014.

In this storage battery, the performance variations (including those of capacitance, self-discharge current and internal resistance) causes an uneven voltage of each storage battery cell, sometimes resulting in the fact that a storage battery cell high in voltage reaches a maximum voltage (i.e., cannot be charged any higher) earlier than others at the time of charging, thus narrowing the working voltage range of the storage battery as a whole or reducing the durability thereof. In view of this, the above-mentioned conventional storage battery adopts such means as connecting a zener diode to a storage battery cell which reaches the maximum voltage early or connecting a resistor or a capacitor to a storage battery cell likely to reach a maximum voltage thereby to suppress the voltage increase thereof.

The apparatus described in JP-A-7-163014, however, is intended to equalize the voltage of each storage battery cell when the storage battery is fully charged and that apparatus cannot exhibit the desired effect thereof when used continuously at an intermediate voltage. Also, since the performance difference between the individual storage battery cells are not compensated for, the working voltage range may be narrowed by a voltage difference which may develop among the storage battery cells during a long-time operation.

SUMMARY OF THE INVENTION

The present invention has been developed in view of this situation, and the object thereof is to obviate the voltage differences due to the performance variations among the individual storage battery cells and thereby to increase the working voltage range while improving the durability of the storage battery as a whole.

In order to achieve the above-mentioned object, according to a first feature of the present invention, there is proposed a storage battery voltage control apparatus for equalizing the voltage of each of a plurality of series-connected storage battery cells of a storage battery cell group, comprising a voltage-correcting storage battery connected in parallel with each storage battery cell, storage battery cell selection means for selecting a given storage battery cell, switching means constituting a circuit for moving the charge between a selected storage battery cell and the voltage-correcting storage battery, and control means for controlling the switching operation of the switching means.

With the above-mentioned configuration, the charge can be moved between the storage battery cells thereby to equalize the voltages thereof and thereby to prevent a specific storage battery cell from reaching the maximum voltage earlier than others at the time of charging. As a result, the working voltage range of a storage battery cell group can be widened while at the same time extending the life of the storage battery cell group as a whole.

Also, according to a second feature of the present invention, there is proposed a voltage control apparatus for a storage battery in which, in addition to the above-mentioned first feature, the storage battery cell group is configured of an electric double layer storage battery.

With this configuration, a large capacity can be secured even when the storage battery cell group is reduced in size and thus a power system high in energy density can be constructed.

Also, according to a third feature of the present invention, there is proposed a voltage control apparatus for a storage battery in which, in addition to the above-mentioned first feature, the value of the electrostatic capacitance of the voltage-correcting storage battery is small as compared with the electrostatic capacitance of the storage battery cells.

With the above-mentioned configuration, the voltage across the voltage-correcting storage battery can be increased within a short time by the charge from the storage battery cells and the voltage of each storage battery cell can be rapidly equalized.

Also, according to a fourth feature of the present invention, there is provided a voltage control apparatus for a storage battery in which, in addition to the above-mentioned first feature, the storage battery cell selection means selects the storage battery cells in the descending order of voltage.

With this configuration, the maximum voltage difference among a plurality of storage battery cells in a storage battery cell group can be rapidly reduced thereby to equalize the voltage of each storage battery cell.

Also, according to a fifth feature of the present invention, there is proposed a voltage control apparatus for a storage battery in which, in addition to the above-mentioned first feature, the control means operates the switching means thereby to control the time and the period of connecting a storage battery cell and the voltage-correcting storage battery.

With this configuration, the voltage of each storage battery cell can be controlled arbitrarily.

Also, according to a sixth feature of the present invention, there is proposed a voltage control apparatus for a storage battery in which, in addition to the above-mentioned first feature, a plurality of storage battery cell groups are connected in series, and a first voltage-correcting storage battery connected to each of the storage battery cell groups is selectively connected to a second voltage-correcting storage battery.

With this configuration, the time required for equalization can be shortened as compared with the case in which the voltage across all the storage battery cells is equalized by the first voltage-correcting storage battery alone. In addition, the voltage across each of the first voltage-correcting storage batteries is equalized by the second voltage-correcting storage battery, thereby further shortening the time required for equalizing all the storage battery cells.

Also, according to a seventh feature of the present invention, there is proposed a voltage control apparatus for a storage battery in which, in addition to the above-mentioned first feature, a plurality of storage battery cell groups are connected in series and the voltage-correcting storage battery connected to each storage battery cell group is selectively connected to the storage battery cells of the storage battery cell groups associated therewith or any one of the storage battery cells of another storage battery cell group.

With this configuration, the time required for equalization can be shortened as compared to a configuration where the voltage across all the cells is equalized by only one voltage-correcting storage battery and, in addition, as compared to the above described sixth feature, one less voltage-correcting storage battery is required.

Also, according to an eighth feature of the present invention, there is proposed a voltage control apparatus for a storage battery of a hybrid vehicle comprising a motor and an engine as driving power sources, in which, in addition to the above-mentioned first feature, the storage battery cell group stores the electric power generated by a generator and drives the motor.

With this configuration, the electric power generated by the generator can be stored in the storage battery cell group and effectively utilized for driving the motor. Particularly, in the case where this power source is used concurrently with a battery, a precise energy absorption and storage for regeneration can be satisfactorily carried out. Also, when the battery is fully charged, energy can be distributively stored among the storage battery cell groups. In addition, since the storage battery cell group has a high output density as compared with the battery, the vehicle can be reduced in weight.

The above and other objects, features and advantages of the present invention will become apparent by the detailed description of the preferred embodiments taken in conjunction with the accompanying drawings below.

DESCRIPTION OF THE PREFERRED EMBODIMENTS

A first embodiment of the present invention will be explained with reference to FIGS. 1 to 6.

Figure 1:
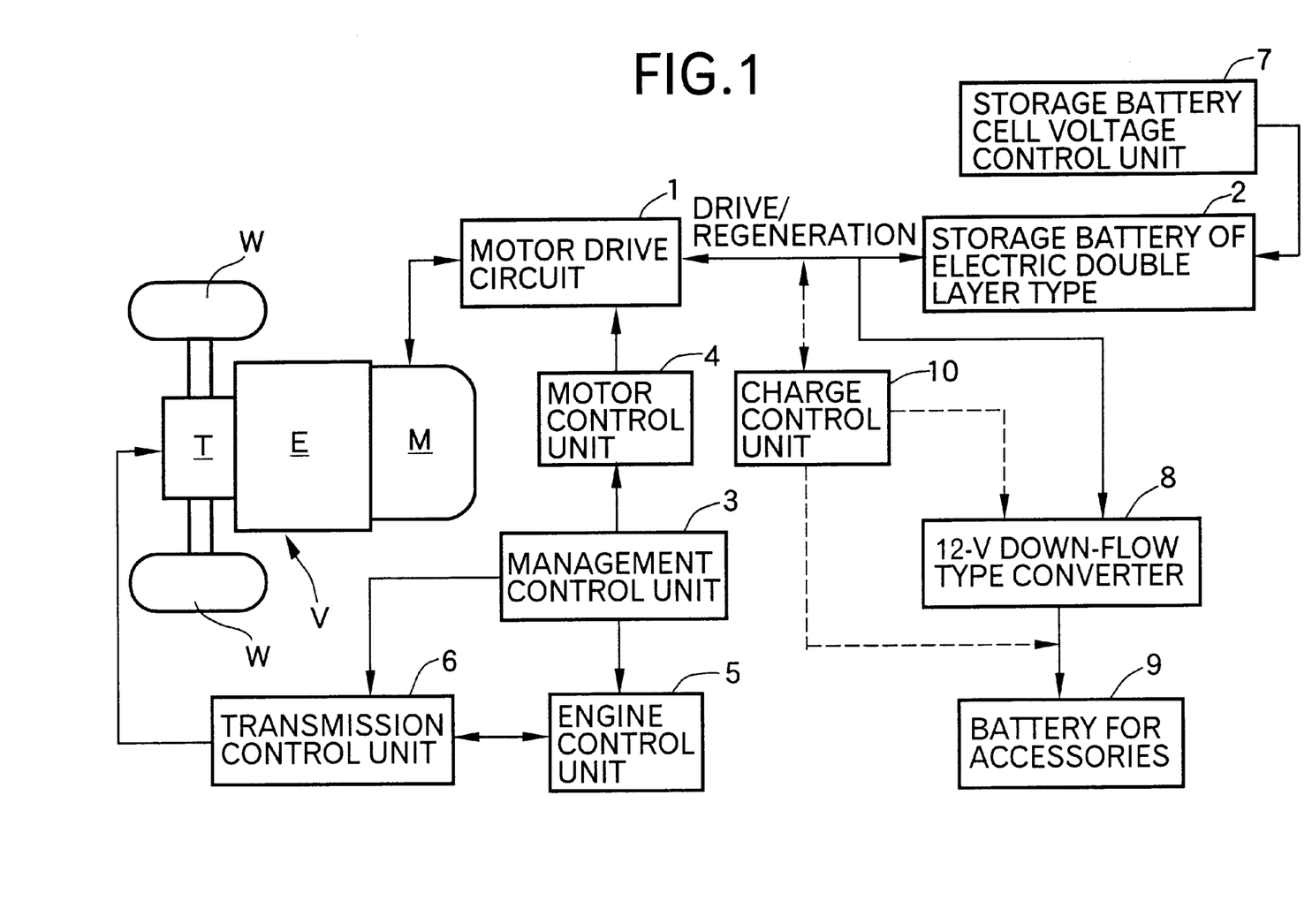
FIG. 1 is a block diagram showing a control system in which the present invention is applied to a hybrid vehicle.

As shown in FIG. 1, a parallel-type hybrid vehicle V comprises an internal combustion engine E, an electric motor M capable of driving and regeneration, and a transmission T. The motor M is connected to a storage battery cell group 2 through a motor drive circuit 1. The storage battery cell group 2 is configured of cell groups of a compact storage battery of the electric double layer type capable of producing a large capacitance. When the vehicle V is running, the driving force of the engine E and/or the motor M is transmitted through the transmission T to driving wheels W. Also, in the case where an extraneous driving force is generated in the engine E or a braking force is applied to the vehicle, the motor M is regeneratively braked, and the electric power generated by the motor M is stored in the storage battery cell group 2.

A management control unit 3 is connected to a motor control unit 4, an engine control unit 5 and a transmission control unit 6. The motor drive circuit 1 is controlled by the motor control unit 4, the engine E is controlled by the engine control unit 5, and the transmission M is controlled by the transmission control unit 6. The storage battery cell group 2 is controlled by a storage battery cell voltage control unit 7 described in detail later.

The motor drive circuit 1 and the storage battery cell group 2 are connected through a 12-V (volt) down-flow type converter 8 to a 12-V battery 9 for accessories. The storage battery cell group 2 and the battery 9 for accessories are controlled by a charge control unit 10.

In this way, the storage battery cell group 2 drives the motor M by storing the electric power generated by the motor M, and therefore the extraneous driving force of the engine E and the driving force which otherwise might be wasted by the braking can be stored in the storage battery cell group 2 and can be effectively utilized for driving the motor M. Also, the use of the storage battery cell group 2 higher in output density than a conventional battery can reduce the weight of the vehicle V.

Figure 2:
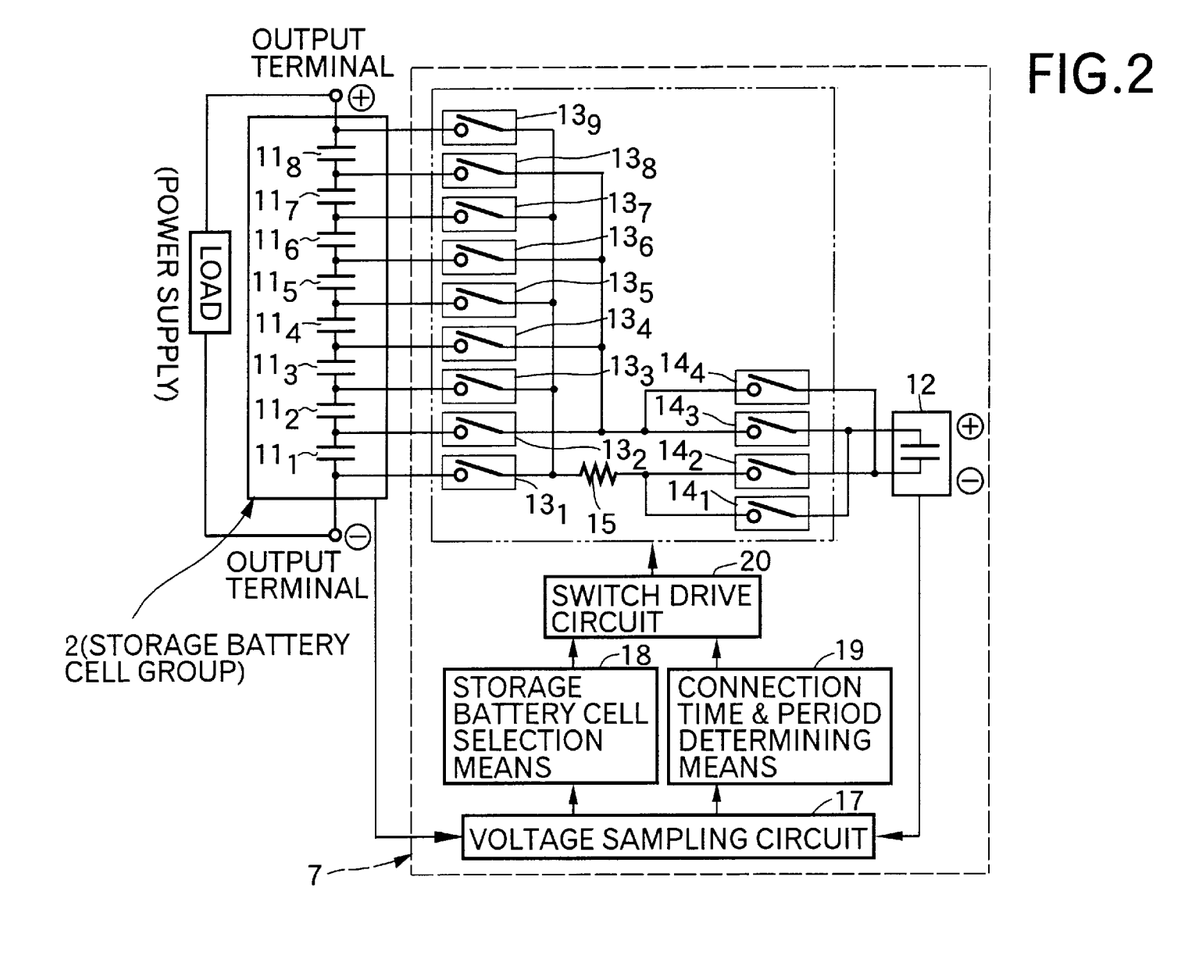
FIG. 2 is a circuit diagram of a voltage control circuit according to a first embodiment of the present invention.

As shown in FIG. 2, the storage battery cell group 2 includes, for example, eight storage battery cells $11_1$ to $11_8$ of the same specification connected in series. The electrostatic capacitance value of each of the storage battery cells $11_1$ to $11_8$ is set to, say, 1600 farad. The storage battery cell voltage control unit 7 includes a voltage-correcting storage battery 12, nine cell change-over switches $13_1$ to $13_9$, four polarity-inverting switches $14_1$ to $14_4$ and a current-limiting resistor 15. When predetermined two of the nine cell change-over switches $13_1$ to $13_9$ and predetermined two of the four polarity-inverting switches $14_1$ to $14_4$ are closed, a predetermined one of the storage battery cells $11_1$ to $11_8$ and the voltage-correcting storage battery 12 are connected to each other through a closed circuit 16 (see FIGS. 3A and 3B for two examples). The electrostatic capacitance value of the voltage-correcting storage battery 12 is set to a value (say, 100 farad) not more than 10% of 1600 farad providing the electrostatic capacitance value of each of the storage battery cells $11_1$ to $11_8$.

Figure 3A:
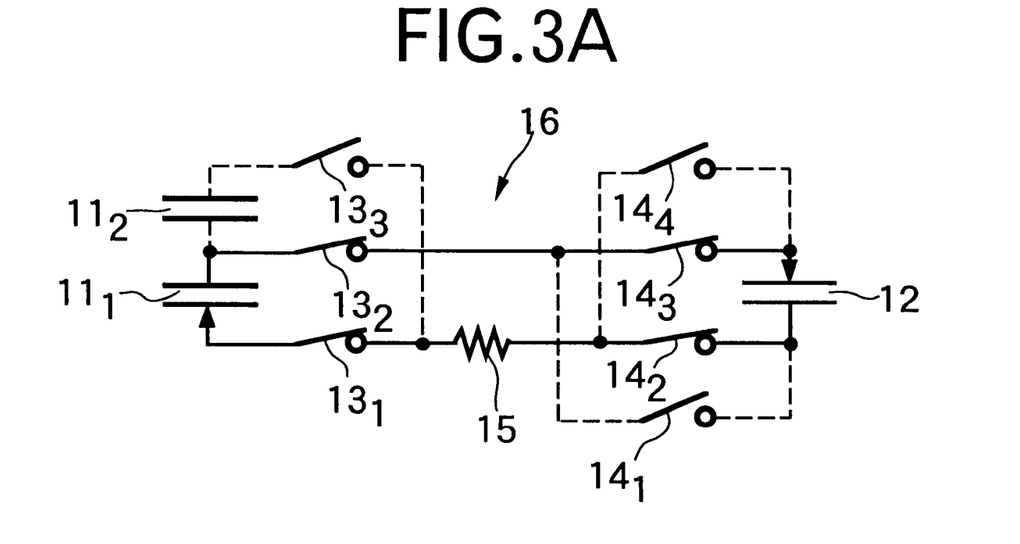
FIGS. 3A and 3B are diagrams for explaining the transfer of the charge.
Figure 3B:
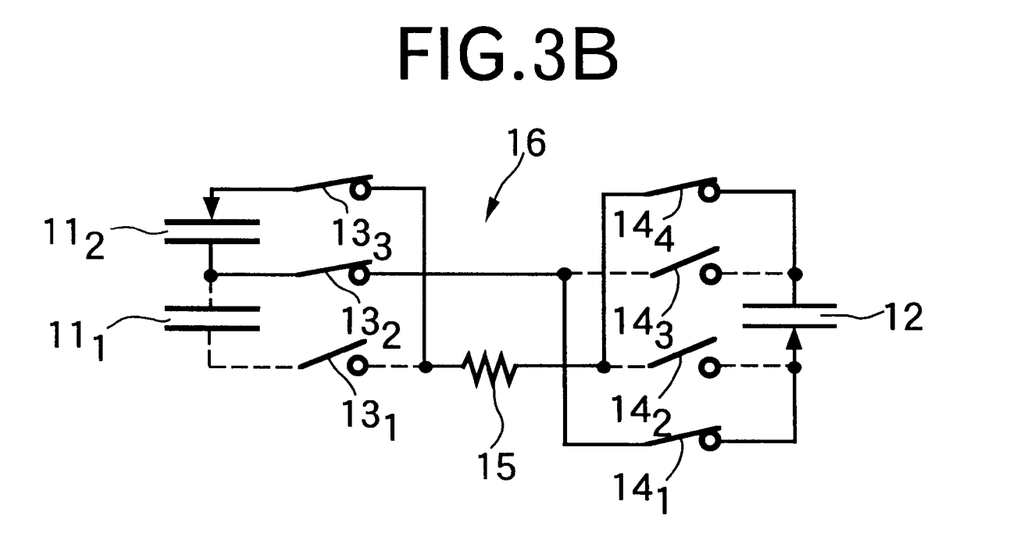

As shown in FIG. 3A, when the two cell change-over switches $13_1$, $13_2$ and the two polarity-inverting switches $14_2$, $14_3$ are closed, for example, the positive electrode of the storage battery cell $11_1$ and the positive electrode of the voltage-correcting storage battery 12 are connected to each other, while at the same time the negative electrode of the storage battery cell 11, and the negative electrode of the voltage-correcting storage battery 12 are connected to each other through the current-limiting resistor 15. When the two cell change-over switches $13_2$, $13_3$ and the two polarity-inverting switches $14_1$, $14_4$ are closed, as shown in FIG. 3B, on the other hand, the positive electrode of the storage battery cell $11_2$ and the positive electrode of the voltage-correcting storage battery 12 are connected to each other through the current-limiting resistor 15, while at the same time the negative electrode of the storage battery cell $11_2$ and the negative electrode of the voltage-correcting storage battery 12 are connected to each other. Similarly, each of the other storage battery cells $11_3$ to $11_8$ may be selectively connected to the voltage-correcting storage battery 12.

The storage battery cell voltage control unit 7 further includes a voltage sampling circuit 17, a storage battery cell selection means 18, a connection time and period determining means 19 and a switch drive circuit 20. The voltage sampling circuit 17 detects the voltage across the eight storage battery cells $11_1$ to $11_8$ and the voltage across the voltage-correcting storage battery 12. The storage battery cell selection means 18 selects the eight storage battery cells $11_1$ to $11_8$ in the descending order of voltage on the basis of the voltage detected above. The connection time and period determining means 19 determines the time during which and the cycle in which the selected storage battery cells $11_1$ to $11_8$ are connected to the voltage-correcting storage battery 12. The switch drive circuit 20 controls the switching operation of the cell change-over switches $13_1$ to $13_9$ and the polarity-inverting switches $14_1$ to $14_4$ on the basis of the storage battery cells $11_1$ to $11_8$ selected in the manner described above and the connection time and the period determined as described above.

Next, the operation of an embodiment of the present invention having the above-mentioned configuration will be explained.

Figure 4:
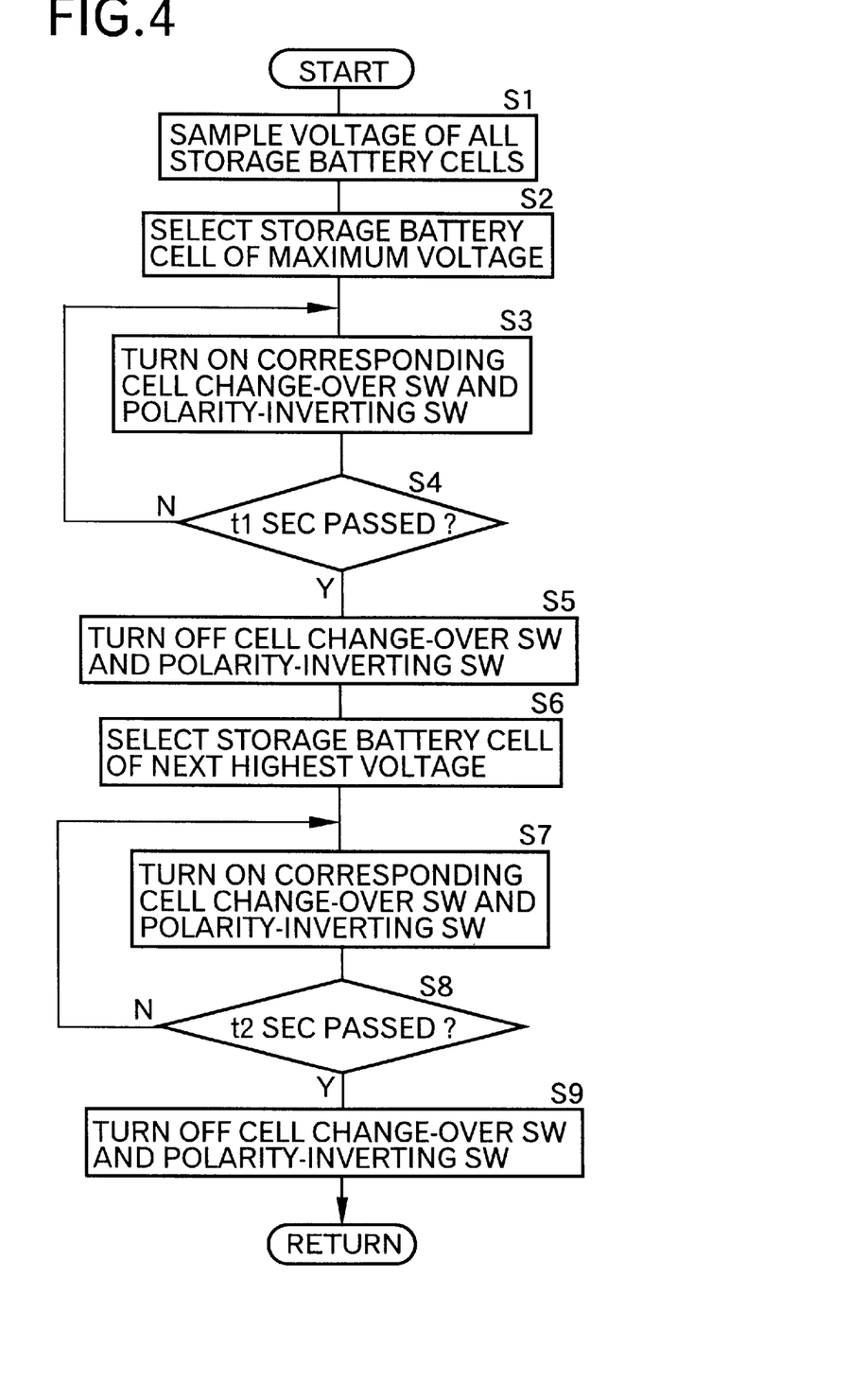
FIG. 4 is a flowchart for explaining the operation.

FIG. 4 is a flowchart for explaining the operation in the case where the storage battery cell group 2 includes only a minimum number of storage battery cells, i.e., two storage battery cells $11_1$, $11_2$ although it will be understood that the procedure is equally applicable to a storage battery cell group 2 with more than two cells. First, the voltage sampling circuit 17 samples the voltage across the two storage battery cells $11_1$, $11_2$ (step S1), and on the basis of the result of this sampling, the storage battery cell selection means 18 selects a storage battery cell having a maximum voltage (say, the storage battery cell $11_1$) (step S2). Once the storage battery cell $11_1$ is selected, as shown in FIG. 3A, the switch drive circuit 20 closes the two cell change-over switches $13_1$, $13_2$ and the two polarity-inverting switches $14_2$, $14_3$ (step S3). As a result, the charge transfers from the storage battery cell $11_1$ through the current-limiting resistor 15 to the voltage-correcting storage battery 12, so that the voltage across the discharging storage battery cell $11_1$ drops while the voltage across the charging voltage-correcting storage battery 12 increases. After the lapse of a connection time $t_1$ determined by the connection time and period determining means 19 (step S4), the switch drive circuit 20 opens the two cell change-over switches $13_1$, $13_2$ and the two polarity-inverting switches $14_2$, $14_3$ thereby to separate the storage battery cell $11_1$ from the voltage-correcting storage battery 12 (step S5).

When the charge transfers from the storage battery cell $11_1$ to the voltage-correcting storage battery 12, the voltage across the voltage-correcting storage battery 12 increases rapidly since the electrostatic capacitance value (100 farad) of the voltage-correcting storage battery 12 is considerably smaller than the electrostatic capacitance value (1600 farad) of the storage battery cell $11_1$. As a result, the equalization of the voltage across each of the storage battery cells $11_1$, $11_2$ can be accomplished within a short time.

Then, once the storage battery cell selection means 18 selects the storage battery cell having the next- highest voltage (i.e., the storage battery cell $11_2$) (step S6), as shown in FIG. 3B, the switch drive circuit 20 closes the two cell change-over switches $13_2$, $13_3$ and the two polarity-inverting switches $14_1$, $14_4$ (step S7). As a result, the charge transfers from the voltage-correcting storage battery 12 through the current-limiting resistor 15 to the storage battery cell $11_2$, so that the voltage across the discharging voltage-correcting storage battery 12 drops while at the same time the voltage across the charging storage battery cell $11_2$ increases. After the lapse of a connection time $t_2$ determined by the connection time and period determining means 19 (step S8), the switch drive circuit 20 opens the two cell change-over switches $13_2$, $13_3$ and the two polarity-inverting switches $14_1$, $14_4$ thereby to separate the storage battery cell $11_2$ from the voltage-correcting storage battery 12 (step S8).

By doing so, the charge transfers from the storage battery cell $11_1$ higher in voltage to the storage battery cell $11_2$ lower in voltage, so that the voltage across the storage battery cell $11_1$ drops while the voltage across the storage battery cell $11_2$ increases, thereby making it possible to equalize the voltages across the two storage battery cells $11_1$, $11_2$.

Figure 5A:
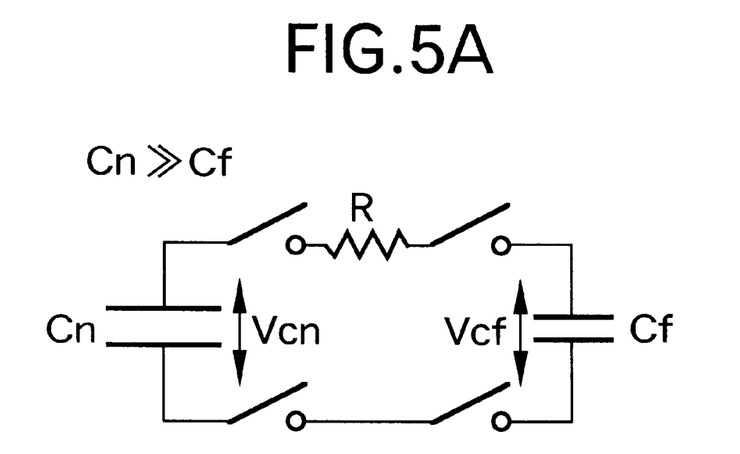
FIGS. 5A and 5B are diagrams for explaining the maximum connection time.

Now, when the charge transfers through a current-limiting resistor having a resistance value R from a first storage battery having an electrostatic capacitance Cn and a terminal voltage Vcn to a second storage battery having an electrostatic capacitance Cf (in the condition Cn >>Cf) and a terminal voltage Vcf (in the condition Vcn >Vcf), as shown in FIG. 5A, assume that the terminal voltage of the second storage battery has changed from Vcf to the desired charge voltage of Vcft after the lapse of t seconds from the start of charge transfer. In the process, assuming that the voltage difference between the first storage battery and the second storage battery before starting the charge transfer is $\Delta V_0$ (=Vcn−Vcf) and the voltage difference upon the lapse of t seconds after the start of charge transfer is $\Delta Vt$ (=Vcft−Vcf), then the relation holds that $$t = Cf \times R \times Ln(1 - \Delta Vt/\Delta V_0)$$

In this equation, t represents the time taken for the voltage across the second storage battery to rise from Vcf to the desired charge voltage Vcft after the start of charge transfer, and this time is defined as the maximum connection time.

Figure 5B:
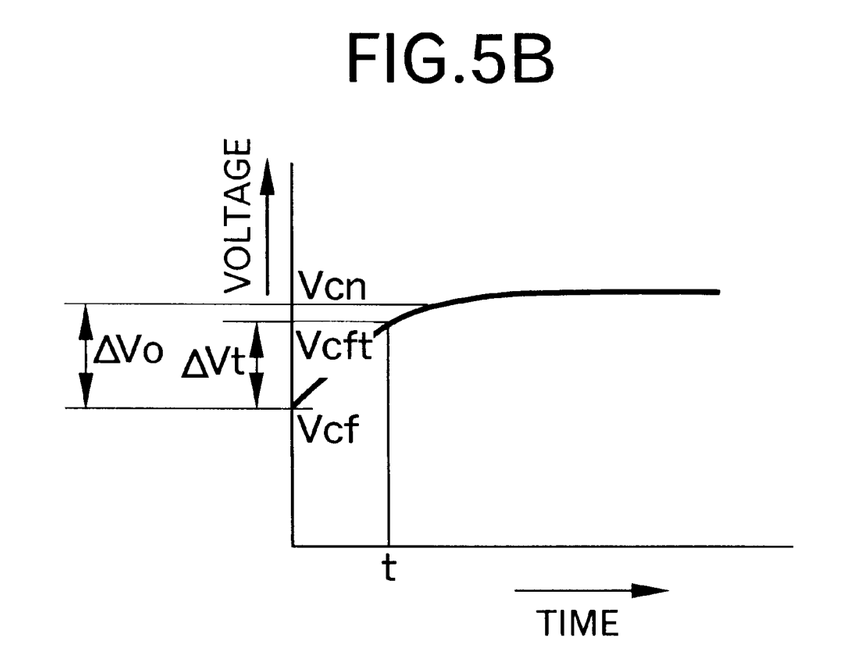

When the storage battery is neither charging nor discharging, on the other hand, assume that the maximum connection time t per storage battery cell is 10 seconds. Suppose the storage battery has N (=100) storage cells, for example. It takes 1000 (=10×100) seconds for each of the 100 storage battery cells to complete one charge transfer, thereby making it difficult to equalize the voltages of each storage battery cell within a short time. If the connection time per storage battery cell is set to t/N and the N storage battery cells are sequentially connected within the maximum connection time t as one cycle, then the charge can be substantially uniformly transferred from the N storage battery cells within a short time.

Also, while the storage battery is charging or discharging, each storage battery cell is required to be connected at sufficiently short time intervals to prevent the terminal voltage Vcn of the storage battery cells from changing. In the case where Vcn changes at the rate of 0.1 volt/sec in the connected state, for example, the rate of Vcn change per storage battery cell can be controlled to 0.001 V as long as the connection time per storage battery cell is set to 1/N (=1/100) seconds.

By changing the period of connecting each of the storage battery cells $11_1$ to $11_8$ to the voltage-correcting storage battery 12 by the connection time and period determining means 19 in this way, the voltage across each of the storage battery cells $11_1$ to $11_8$ can be arbitrarily controlled.

Figure 6:
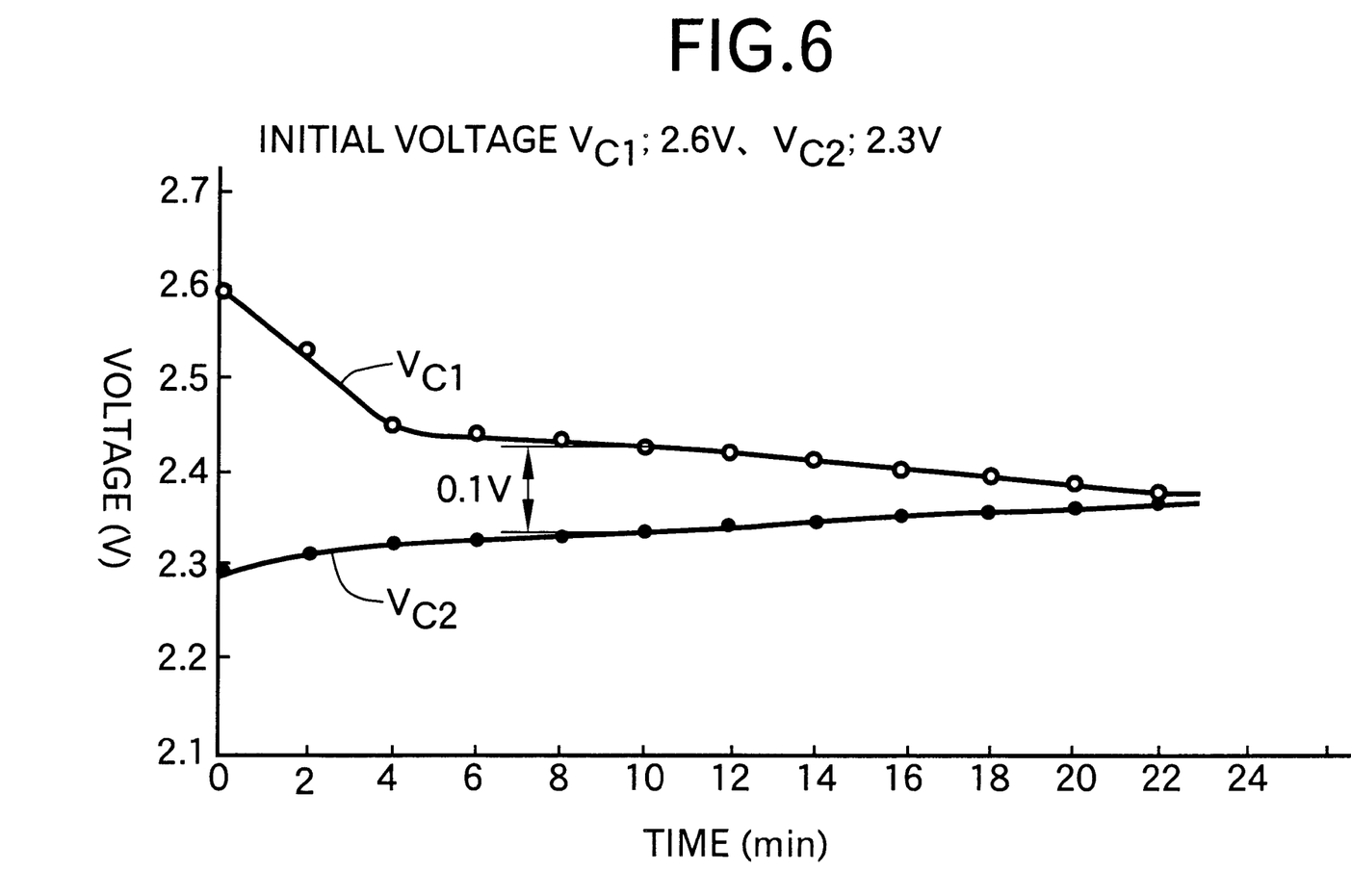
FIG. 6 is a graph for explaining the effects.

FIG. 6 shows the result of an experiment conducted for the storage battery cell group 2 having the two storage battery cells $11_1$, $11_2$ shown in FIGS. 3A and 3B, in which the charge has been transferred in cycles of 25 seconds from the initial voltage $Vc_1$ of 2.6 volts across the storage battery cell $11_1$ and the initial voltage $Vc_2$ of 2.3 volts across the storage battery cell $11_2$. As is apparent from this diagram, the voltage difference which initially stood at 0.3 volt dropped to 0.1 volt about ten minutes later and to about zero after twenty-two minutes. It is thus seen that the voltages across the two storage battery cells $11_1$, $11_2$ have been equalized.

As described above, the voltage across each of the storage battery cells $11_1$ to $11_8$ is equalized by charge transfer between the eight storage battery cells $11_1$ to $11_8$ of the storage battery cell group 2, and thus each of the storage battery cells $11_1$ to $11_8$ can be prevented from reaching the maximum voltage earlier than the others at the time of charging. The working voltage range of the storage battery cell group 2 as a whole can thus be enlarged while at the same time lengthening the life thereof.

Figure 7:
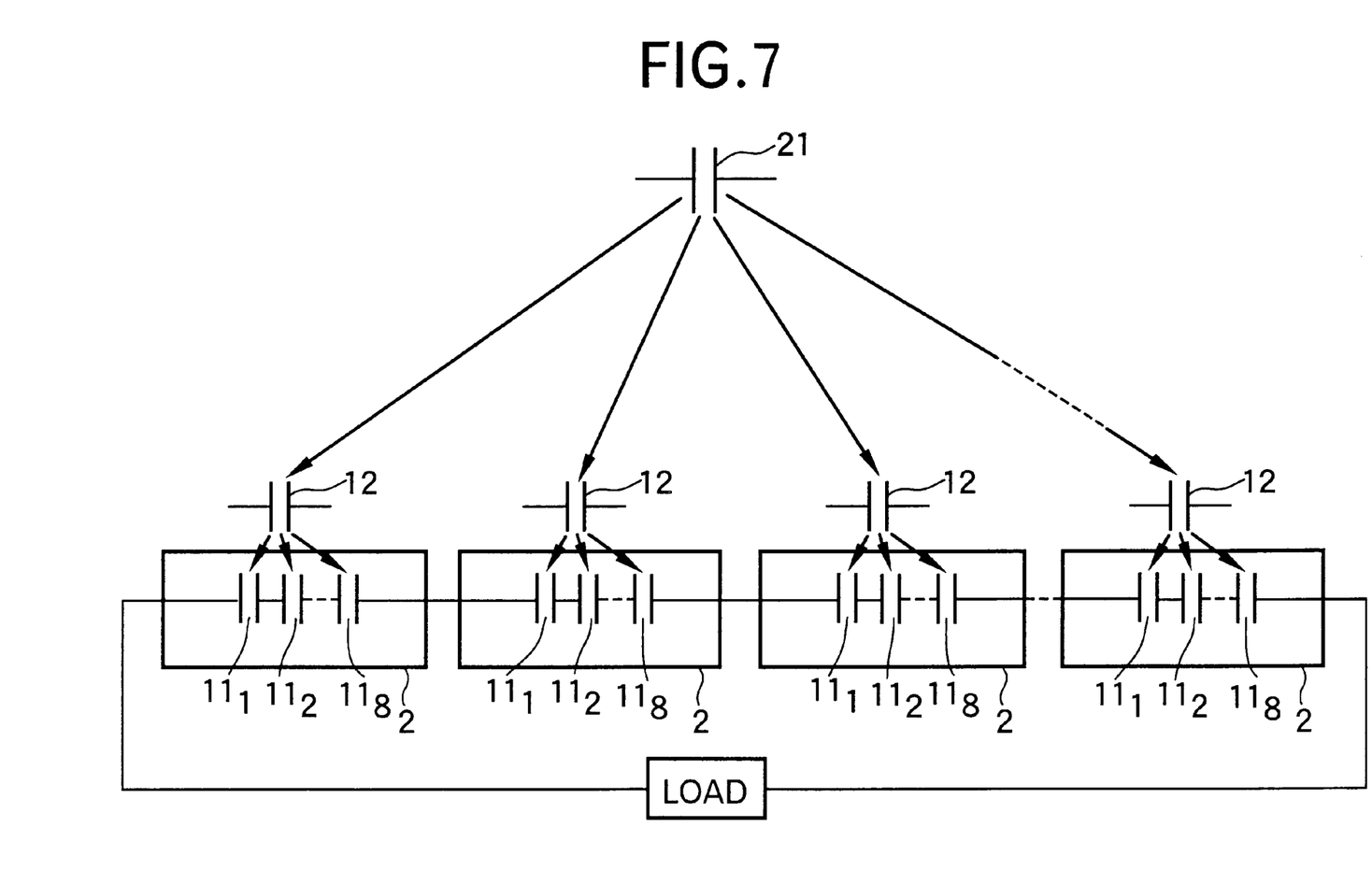
FIG. 7 is a circuit diagram showing a voltage control circuit according to a second embodiment of the present invention.

Next, a second embodiment of the present invention will be explained with reference to FIG. 7.

The second embodiment is such that a plurality of storage battery cell groups 2 are connected in series. Like in the first embodiment, the storage battery cell groups 2 each include a voltage-correcting storage battery 12 (a first voltage-correcting storage battery 12). A plurality of the voltage-correcting storage batteries 12 are connected alternately to a common second voltage-correcting battery 21. In this way, by connecting in series a plurality of the storage battery cell groups 2 each having the voltage-correcting storage battery 12, the number of the storage battery cells sharing a single voltage-correcting storage battery 12 can be suppressed to a predetermined number (say eight) even when a multiplicity of the storage battery cells are used for producing a high voltage, thereby making it possible to shorten the time required for equalizing the voltage across each of all the storage battery cells. Further, in view of the fact that each of the voltage-correcting storage batteries 12 is connected selectively to the second voltage-correcting storage battery 21, the voltage across each of the voltage-correcting storage batteries 12 can be equalized by the second voltage-correcting storage battery 21 thereby to further shorten the time required for voltage equalization of all the storage battery cells.

Figure 8:
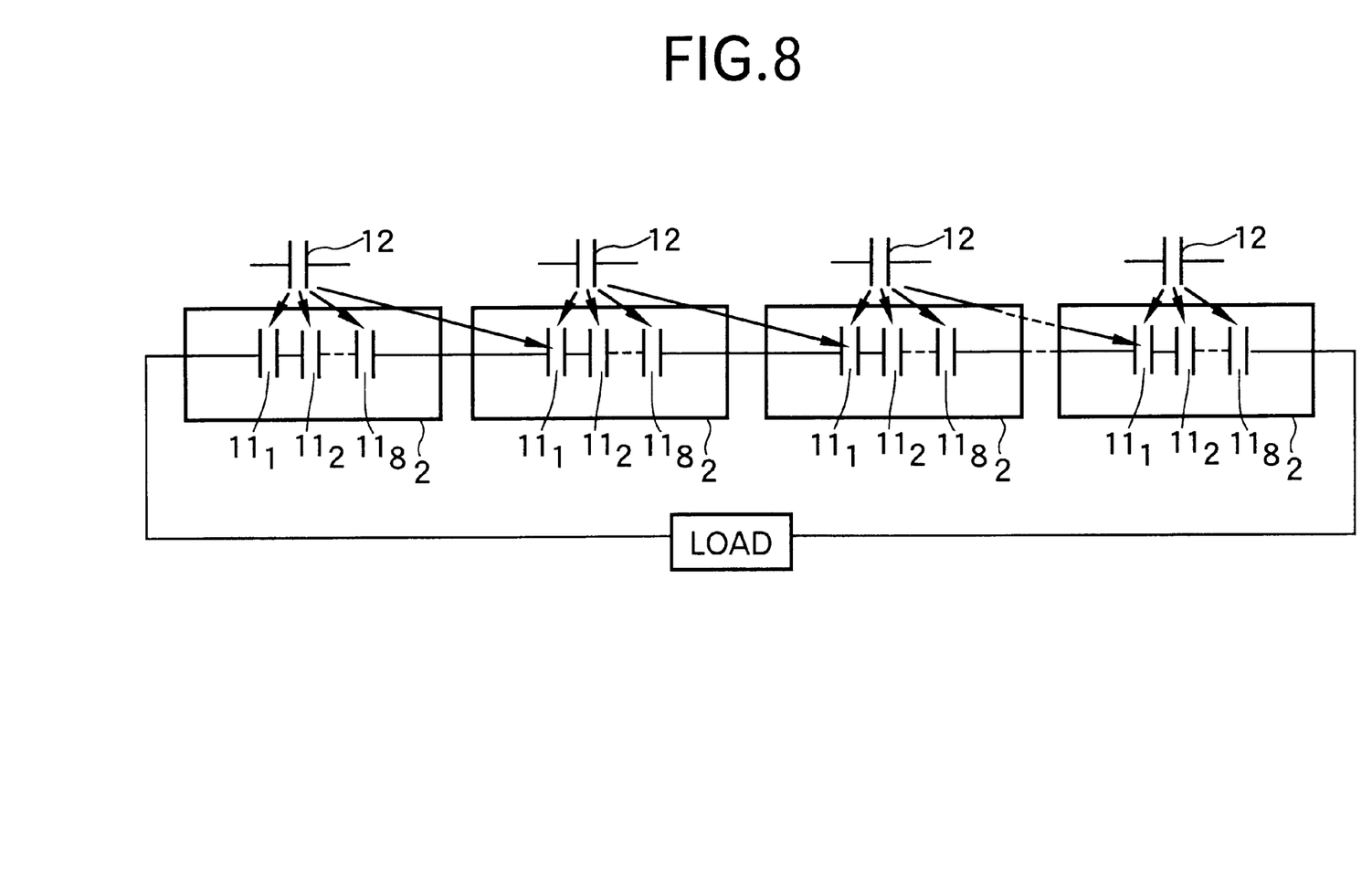
FIG. 8 is a circuit diagram of a voltage control circuit according to a third embodiment of the present invention.

Next, a third embodiment of the present invention will be explained with reference to FIG. 8.

In the third embodiment, like in the second embodiment, a plurality of storage battery cell groups 2 are connected in series. The voltage-correcting storage battery 12 for each storage battery cell group 2 is connected selectively to eight storage battery cells $11_1$ to $11_8$ of the storage battery cell group 2 associated therewith or to a storage battery cell (say, the storage battery cell $11_1$) of an adjacent storage battery cell group 2. Consequently, the number of the storage battery cells sharing a single voltage-correcting storage battery 12 can be suppressed to 9. In this way, not only can the time required for voltage equalization be shortened but also the voltage across each of the voltage-correcting storage batteries 12 can be equalized by an exchange of the charge with the storage battery cell $11_1$ of the adjacent storage battery cell group 2, thereby further shortening the time required for equalizing the voltage across each cell of all the storage battery cells.

Embodiments of the present invention were described in detail above. The present invention, however, can be modified in design variously within the scope without departing from the spirit thereof.

Although the storage battery cell group 2 in the embodiments described above comprises eight storage battery cells $11_1$ to $11_8$, for example, the number is not limited to eight. Also, the invention is not confined to a hybrid vehicle but is applicable to storage batteries in other arbitrary fields as well. Further, the invention can be applied to a hybrid vehicle comprising a generator and a motor independent of each other. Furthermore, the storage battery cell group 2 and the battery can be combined, in which case the sharp energy absorption and power storage at the time of regeneration can be smoothly performed and the energy can be distributed and storage performed appropriately among the storage battery cell groups 2 when the battery is fully charged.

We claim:

1. A storage battery voltage control apparatus for equalizing the voltage of each of a plurality of series-connected storage battery cells of a storage battery cell group, comprising a voltage-correcting storage battery for connecting in parallel to each of said storage battery cells, storage battery cell selection means for selecting an arbitrary storage battery cell, switching means constituting a circuit for charge transfer between the storage battery cells and said voltage-correcting storage battery such that in a voltage-correcting operation said voltage-correcting storage battery is connected to one of said storage battery cells at one time to conduct a charge transfer therebetween in either direction for equalizing the voltages of said voltage-correcting storage battery and said one storage battery cell, and control means for controlling the switching operation of said switching means, wherein said charge transfer includes a charge transfer from a storage battery cell having a highest voltage to said voltage-correcting storage battery.

2. A voltage control apparatus for a storage battery according to claim 1, wherein said storage battery cell group constitutes a storage battery of an electric double layer type.

3. A voltage control apparatus for a storage battery according to claim 1, wherein the electrostatic capacitance value of said voltage-correcting storage battery is small compared with the electrostatic capacitance value of said storage battery cells.

4. A voltage control apparatus for a storage battery according to claim 1, wherein said storage battery cell selection means selects said storage battery cells in the descending order of voltage.

5. A voltage control apparatus for a storage battery according to claim 1, wherein said control means controls a connection time during which and the cycle in which said storage battery cells and said voltage-correcting storage battery are connected to each other, by operating said switching means.

6. A voltage control apparatus for a storage battery according to claim 1, wherein a plurality of said storage battery cell groups are connected in series, and a first voltage-correcting storage battery connected to each said storage battery cell group is selectively connected to a second voltage-correcting storage battery.

7. A voltage control apparatus for a storage battery according to claim 1, wherein a plurality of said storage battery cell groups are connected in series, and said voltage-correcting storage battery connected to each said storage battery cell group is selectively connected to the storage battery cells associated with said storage battery cell group or any one of the storage battery cells of another storage battery cell group.

8. A voltage control apparatus according to claim 1 for a storage battery of a hybrid vehicle comprising an engine and a motor as a driving power source, wherein said storage battery cell group drives the motor by storing the electric power generated by a generator.

9. A voltage control apparatus for a storage battery according to claim 1, wherein the electrostatic capacitance value of said voltage-correcting storage battery is sufficiently small compared with the electrostatic capacitance value of said storage battery cells to cause a rapid charge transfer between said selected storage battery cell and said voltage-correcting storage battery.

10. A voltage control apparatus for a storage battery according to claim 1, further comprising a voltage sampling circuit for determining the voltage of each said storage battery cell, and wherein said storage battery cell selection means selects said storage battery cells in a descending order of voltage.

11. A voltage control apparatus for a storage battery according to claim 10, wherein said control means controls a connection time during which a cycle in which said storage battery cells and said voltage-correcting storage battery are connected to each other, by operating said switching means.

12. A storage battery voltage control apparatus for equalizing the voltage of each of a plurality of series-connected storage battery cells of a storage battery cell group, comprising a voltage-correcting storage battery for connecting in parallel to each of said storage battery cells, storage battery cell selection means for sequentially selecting each of said storage battery cells, a switching circuit means for connecting said selected storage battery cell to said voltage-correcting storage battery for transferring a charge from the one of either said selected storage battery cell or said voltage-correcting storage battery that has the higher voltage to the other of said selected storage battery cell and said voltage-correcting storage battery for reducing a voltage difference therebetween, wherein said transferring of the charge includes a charge transfer from a storage battery cell having a highest voltage to said voltage-correcting storage battery.

13. A voltage control apparatus for a storage battery according to claim 12, wherein said storage battery cell group constitutes a storage battery of an electric double layer type.

14. A voltage control apparatus for a storage battery according to claim 13, wherein the electrostatic capacitance value of said voltage-correcting storage battery is small compared with the electrostatic capacitance value of said storage battery cellos.

15. A voltage control apparatus for a storage battery according to claim 12, including means for detecting the voltage of each said storage battery cell, and said storage battery cell selection means selects said storage battery cells for equalizing in the descending order of voltage.

16. A voltage control apparatus for a storage battery according to claim 12, wherein said control means controls a connection time during which and the cycle in which said storage battery cells and said voltage-correcting storage battery are connected to each other, by operating said switching circuit means.

17. A voltage control apparatus for a storage battery according to claim 12, wherein a plurality of said storage battery cell groups are connected in series, and a first voltage-correcting storage battery connected to each said storage battery cell group is selectively connected to a second voltage-correcting storage battery.

18. A voltage control apparatus for a storage battery according to claim 12, wherein a plurality of said storage battery cell groups are connected in series, and said voltage-correcting storage battery connected to each said storage battery cell group is selectively connected to the storage battery cells associated with said storage battery cell group and any one of the storage battery cells of another storage battery cell group.

19. A voltage control apparatus for a storage battery according to claim 12, wherein the electrostatic capacitance value of said voltage-correcting storage battery is sufficiently small compared with the electrostatic capacitance value of said storage battery cells to cause a rapid charge transfer between said selected storage battery cell and said voltage-correcting storage battery.

20. A voltage control apparatus for a storage battery according to claim 19, wherein said control means includes means for causing said switching circuit means to sequentially connect all of said storage battery cells to said voltage-correcting storage battery for a short duration and for a plurality of cycles for progressively equalizing the voltage of all said storage battery cells.

* * * * *